United States Patent [19]

Hesskamp et al.

[11] 3,717,597
[45] Feb. 20, 1973

[54] SELF-EXTINGUISHING POLYURETHANE FOAM COMPOSITE MATERIALS AND METHOD OF PREPARING SAME

[75] Inventors: Robert G. Hesskamp, St. Louis County, Mo.; Kenneth P. Meyer, East St. Louis, Ill.; Rogelio Tornero, Ferguson, Mo.

[73] Assignee: M R Plastics and Coatings, Inc., Maryland Heights, Mo.

[22] Filed: Oct. 26, 1971

[21] Appl. No.: 192,556

[52] U.S. Cl..........260/2.5 AJ, 161/403, 260/2.5 AK, 260/2.5 BE, 260/45.9 R
[51] Int. Cl.....................C08g 51/60, C08g 22/44
[58] Field of Search.........260/2.5 AJ, 2.5 AK, 45.9, 260/2.5 BE; 161/403

[56] References Cited

UNITED STATES PATENTS 3,464,872  9/1969  Everett .........................260/2.5 AK
3,401,128  9/1968  Terry .............................260/2.5 AK

FOREIGN PATENTS OR APPLICATIONS 1,158,698  7/1969  Great Britain
1,480,362  5/1967  France
1,406,036  6/1965  France

*Primary Examiner*—Donald E. Czaja
*Assistant Examiner*—C. Warren Ivy
*Attorney*—Donald G. Leavitt et al.

[57] ABSTRACT

Self-extinguishing composite material comprises particulate polyurethane foam bound together with a binder. The binder forms a network within which the particles of foam material are included. At least about 6.67 parts by weight urea per 100 parts by weight foam are distributed throughout the composite and located between the foam particles. The urea serves as a fire retardant for the composite. A method of preparing self-extinguishing foam composites is also disclosed.

7 Claims, No Drawings

SELF-EXTINGUISHING POLYURETHANE FOAM COMPOSITE MATERIALS AND METHOD OF PREPARING SAME

BACKGROUND OF THE INVENTION

This invention relates to the field of polyurethane foam products, and more particularly to a self-extinguishing foam composite material.

Polyurethane foam is in common use as a light construction material, insulation material, etc. In the fabrication of polyurethane foam products, a certain amount of scrap material is inevitably generated. This scrap material may be reclaimed, reduced to particulate form, and used to produce a useful, flexible foam composite material with the aid of a binder to bind together the particles of scrap foam. Because it is normally made from scrap material, such a composite usually has a cost advantage over flexible polyurethane foam material freshly prepared from the basic chemical raw materials. Numerous useful products are prepared from a flexible scrap foam composite, such as carpet underlay or padding and such products have been known to the art for some time.

Though the flexible scrap foam composite materials known heretofore have been both useful and economical, most of such previously available materials have suffered the disadvantage of being flammable. Flammability of these composites raises obvious hazards where, for example, a scrap foam composite is used as carpet underlay for installation in the home. In applications where the risk of fire is high, of course, flammable composite materials are not considered suitable for use.

In the copending and coassigned application of Robert G. Hesskamp, Ser. No. 60,098, filed July 31, 1970, a fire retardant binder is disclosed which, when used in the production of composite foam materials, imparts flame retardancy to such materials. This binder contains a halogenated organophosphorus compound of relatively complex molecular structure which serves as the fire retarding agent. While foam composites prepared from this binder possess very satisfactory self-extinguishing properties, the fire-retardant material contained therein is somewhat expensive, thus partially offsetting the principal advantage of foam composite materials, i.e., their low cost.

As noted in the aforementioned application, there are a few other fire retardants which, if used in excessive quantities, will impart self-extinguishing properties to a foam composite. Thus, for example, brominated polyether urethane prepolymers (such as that sold under the trade designation "Brominex 9115" by Swift Chemical Company) and brominated polyether polyols (such as that marketed under the trade designation "Brominex 126" by Swift Chemical Company) could be used, but the quantities of these fire retardants required to render a foam composite self-extinguishing are so great as to very seriously compromise the cost advantages of a foam composite. In the quantities required to impart self-extinguishing properties to foam composite, moreover, brominated polyether urethane prepolymers cause the composite product to be boardy. The principal applications for foam composites, for example, as carpet underlay, require that the composite be flexible.

Another common fire retardant material whose incorporation in a foam composite will render the composite self-extinguishing is antimony oxide powder. However, antimony oxide does not become integrated into the foam composite structure and, as a result, the loose particles of antimony oxide impart a powdery character to the composite.

SUMMARY OF THE INVENTION

Among the several objects of the present invention, therefore, may be noted the provision of a polyurethane foam composite which is self-extinguishing; the provision of such a foam composite which includes a relatively inexpensive material as a fire retardant; the provision of such a composite which is flexible and substantially dust-free; and the provision of a method for producing self-extinguishing polyurethane foam composite materials. Other objects and features will be in part apparent and in part pointed out hereinafter.

The present invention is broadly directed, therefore, to a self-extinguishing composite material comprising particulate polyurethane foam material bound together by a binder. The binder forms a network within which particles of the composite are included. At least about 6.67 parts by weight urea per 100 parts by weight foam is distributed throughout the composite and located between the foam particles. The invention is further directed to a method of preparing self-extinguishing foam composites comprising particles of polyurethane foam bonded together. The method comprises mixing particulate polyurethane foam with a binder formulation and with solid particulate urea; and compressing the mixture of foam, binder formulation, and urea in the presence of a curing agent for the binder formulation to produce a cohesive composite product of said particles of polyurethane foam bonded together.

DESCRIPTION OF THE PREFERRED EMBODIMENT

It has now been discovered that modest proportions of urea, a common, abundant and inexpensive organic chemical, impart self-extinguishing properties to polyurethane foam composite materials. Thus, for the first time, a fully satisfactory self-extinguishing foam composite is provided without the necessity of incorporating relatively complex or expensive fire retardant materials therein. The composite material of the invention is both flexible and substantially dust-free and thus constitutes a desirable material for use as carpet underlay, etc.

Although urea has found prior use as a fire retardant for textiles, it has not heretofore been considered suitable for use in urethane systems. Because of its two amine groups, urea would be expected to constitute an active catalyst which would tend to cause the formation of a brittle polymer structure from a prepolymer such as the binder formulations used in preparing foam composite materials. In the powdered form to which the urea must be reduced to allow its incorporation in a foam composite blend, moreover, urea would be expected to impart the same dusty character that results when antimony oxide is used as a fire retardant for foam composite. Suprisingly, however, it has been found that foam composites can be prepared which incorporate fire retarding quantities of urea and yet are both flexible and dust-free.

The reasons for these unexpectedly favorable effects of urea in a foam composite are not fully understood. While we, therefore, do not wish to be held to any particular theory, it is believed that urea has a substantially lower activity in urethane systems than its structure would suggest. Thus, no adverse effect on flexibility is experienced since the urea does not play a major part in the curing reactions. The substantially dust-free character of the composites of the invention is perhaps even more difficult to account for. In part, at least, it would seem to result from the relatively low proportions of urea which are required to produce a composite which is self-extinguishing.

In a preferred embodiment of the invention, as more fully set forth below, the binder of the composite is cured by passing steam through the foam/binder formulation mixture. Since water is a solvent for urea, moisture condensing from the steam in the composite formulation may dissolve the powdered urea and redeposit it as a film or as microcrystalline particles imbedded in the binder network. The urea may become integrated into the foam composite structure in this fashion. In the course of microscopic examinations of steam-cured composites of the invention, we have been unable to detect the presence of individual crystals or particles of urea. The dissolution and redeposit theory might also explain the lack of dustiness of composites which are hot-oven-cured with liquid water. In accordance with the invention, however, it is also possible to produce dust-free composites in which the binder is catalytically-cured. In view of the relatively small proportions of amines used in catalytically curing urethane prepolymer binder formulations, it is unlikely that a mechanism of dissolution and redeposit of urea accounts for the lack of dustiness in such composites. While we are, therefore, unable to provide a comprehensive explanation of the phenomenon which we have observed, we have discovered that urea is a satisfactory fire-retardant whose use produces a dust-free composite.

Although self-extinguishing properties are imparted by using a relatively low proportion of urea, the minimum proportion of urea required is critical. Thus, composites containing 6.67 or more parts by weight urea per 100 parts by weight foam are self-extinguishing. However, if the pad contains less than about 6.67 parts urea per 100 parts foam, it loses essentially all of its self-extinguishing properties. In a preferred embodiment of the invention, the composite contains approximately 8 parts by weight urea per 100 parts by weight foam. Amounts of 10 or more parts per 100 parts can be utilized but are unnecessary.

Any of the conventional binders which are useful for binding together particulate polyurethane foam may be used to produce the foam composite material of the invention. The binder formulation is preferably a urethane prepolymer composition containing between about 2 percent and about 10 percent by weight free isocyanate groups. Such a prepolymer formulation is prepared by blending a polyether polyol with an excess of an organic diisocyanate, triisocyante or polyisocyanate. This blend is partially polymerized into an effective binder by holding it at a temperature in the range of 170°F. for approximately two hours and then aging it for approximately forty-eight hours prior to use.

Numerous commercially available isocyanate compounds may be used in preparing the binder formulation. Typical of these are toluene 2-4-diisocyanate, toluene 2-6-diisocyanate, diphenylmethane diisocyanate, hexamethylene diisocyanate, 1-5-naphthalene diisocyanate, triphenylmethane triisocyanate, xenylene diisocyanate and chlorophenylene diisocyanate. Various polymeric isocyanate compounds such as polymeric toluene diisocyanate and polymeric diphenylmethane diisocyanate may also be used. Polyether polyols useful in preparing a binder for the foam composite of the invention include, for example, polyoxyethylenes, polyoxypropylenes, and polyoxybutylenes having molecular weights between about 2,500 and about 6,000 as produced by the polyol initiated polymerization of ethylene oxide, propylene oxide and butylene oxide, respectively. Typical initiators include ethylene glycol, glycerol, trimethylolethane, and propane, butane, pentane and hexane triols.

To prepare the self-extinguishing foam composite material of the invention, particulate polyurethane foam which has been rendered free of wood, scrim, or other contaminants is mixed with at least about 10 percent by weight of the binder formulation. Either before or after the addition of the binder formulation, powdered urea is mixed with the particulate foam. The mixture of binder formulation, foam and urea is placed in compression, for a few minutes, in the presence of a curing agent to produce the composite. The curing agent may be either water or an amine such as, for example, triethylenediamine, tetramethylbutane diamine, dimethylethanolamine, diethanolamine or trimethylguanidine. If an amine is used, it is added to the foam/binder formulation mixture immediately before the mixture is put under compression. If water is used, it may be added in liquid form under the same circumstances as described for an amine or, preferably, water vapor may be passed into the foam/binder formulation mixture after the latter has been put under compression.

The product is a composite material constituted by particles of polyurethane foam which are bound together by the cured binder. The cured binder material forms a network within which particles of foam are included. The urea is situated between the foam particles and is believed to be substantially uniformly distributed throughout the binder network.

The following examples illustrate the invention:

EXAMPLE 1

A binder formulation was prepared by mixing a polyether polyol having a molecular weight of about 4030 sold under the trade designation PG 4030 by Olin Mathieson Company (70 percent by weight) and toluene diisocyanate (30 percent by weight). The binder formulation was subjected to moderate agitation under an inert atmosphere at a temperature of around 90°F. for a period of about 45 minutes and then discharged into drums. The drums were allowed to stand for a period of about 48 hours so that the formulation could partially self-cure.

Ten parts by weight of the binder formulation were then mixed with 100 parts by weight of particulate polyurethane foam material which had, in turn, been prepared by chopping up polyurethane foam scrap. Seven parts by weight powdered urea were added and the resulting mixture was thoroughly mixed and then placed under compression between two perforated steel plates. Water vapor was passed through the perforations into the compressed mixture to cure the binder; after a few minutes a pad of foam composite material was removed from between the plates.

The composite pad was heated to a temperature of approximately 200°F. and held overnight at this temperature. The following day the pad was cooled to a temperature below freezing and again held overnight. Flammability tests were then conducted.

To determine the flammability characteristics of the pad, a standard 0.5 mil. flammable methenamine pill was placed on the pad and another such pill placed on another pad which had been produced in the same fashion except that no flame retardant was included. Both pills were ignited and allowed to burn. After the pills were consumed, all combustion ceased on the pad containing urea while the pad prepared without a fire retardant continued to burn.

The pad containing urea was then subjected to tensile testing and determined to have a tensile strength of 7.7 psi, comparable to composite polyurethane foam pads which do not contain fire retardants.

EXAMPLE 2

A binder formulation was prepared by mixing a polyether triol having a molecular weight of about 4100, sold under the trade designation "CP-4100" by Dow Chemical Company (68 percent by weight) toluene diisocyanate (20 percent by weight) and methylene chloride (12 percent by weight). The binder formulation was subjected to moderate agitation under an inert atmosphere at a temperature of around 90°F. for a period of about 45 minutes and then discharged into drums. The drums were allowed to stand for a period of about 48 hours so that the formulation could partially self-cure.

Ten parts by weight of this binder formulation were mixed with 100 parts by weight of particulate polyurethane foam which had been prepared in the manner described in Example 1. Seven parts by weight powdered urea were added and a foam composite pad was prepared from the resulting mixture in the manner described in Example 1.

The pad thus produced was exposed to the same heating and freezing conditions as was the pad of Example 1. After such exposure, the pad of this example was subjected to flammability and tensile strength tests as described in Example 1. After consumption of the methenamine pill, combustion on the pad of this example ceased. The pad was determined to have a tensile strength of 7.0 psi.

EXAMPLE 3

A foam composite pad was prepared in the manner described in Example 2 except that 8 parts by weight urea were included and the binder was cured using an alkali-amine catalyst at room temperature.

The pad thus produced was exposed to the same heating and freezing conditions as was the pad of Example 1. After such exposure, the pad of this example was subjected to flammability and tensile strength tests as described in Example 1. After consumption of the methenamine pill, combustion on the pad of this example ceased. The pad was determined to have a tensile strength of 7.0 psi.

EXAMPLE 4

A foam composite pad was prepared in the manner described in Example 1 except that the binder was cured in an oven at about 250°F. with liquid water.

The pad thus produced was exposed to the same heating and freezing conditions as was the pad of Example 1. After such exposure, the pad of this example was subjected to flammability and tensile strength tests as described in Example 1. After consumption of the methenamine pill, combustion on the pad of this example ceased. The pad was determined to have a tensile strength of 7.2 psi.

EXAMPLE 5

A foam composite pad was prepared in the manner described in Example 2 except that 10 parts by weight urea were included.

The pad thus produced was exposed to the same heating and freezing conditions as was the pad of Example 1. After such exposure, the pad of this example was subjected to flammability and tensile strength tests as described in Example 1. After consumption of the methenamine pill, combustion on the pad of this example ceased. The pad was determined to have a tensile strength of 7.4 psi.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A self-extinguishing composite material comprising particulate polyurethane foam material bound together by a polyurethane binder, said binder forming a network within which the particles of said foam material are included, and at least about 6.67 parts by weight urea per 100 parts by weight foam, said urea being distributed throughout the composite and located between the foam particles.

2. A composite material as set forth in claim 1 wherein the urea content is between about 8 and about 10 parts by weight per 100 parts by weight foam.

3. A composite material as set forth in claim 1 wherein said binder is derived from curing a urethane prepolymer binder formulation containing between about 2 percent and about 10 percent by weight free isocyanate groups.

4. A method of preparing self-extinguishing foam composites comprising particles of polyurethane foam bonded together, the method comprising:

mixing particulate polyurethane foam with a polyurethane binder formulation and with solid particulate urea; and compressing the mixture of foam, binder formulation, and urea in the presence of a curing agent for the binder formulation to produce a cohesive composite product of said particles of polyurethane foam bonded together with urea distributed throughout the composite.

5. A method as set forth in claim 4 wherein said mixture of foam, binder formulation, and urea contains at least about 6.67 parts by weight urea per 100 parts by weight foam.

6. A method as set forth in claim 5 wherein said mixture of foam, binder formulation and urea contains between about 8 and about 10 parts by weight urea per 100 parts by weight foam.

7. A method as set forth in claim 4 wherein said curing agent is steam.

* * * * *